C. F. DUKE & P. F. WRIGHT.
CLUTCH MECHANISM.
APPLICATION FILED NOV. 17, 1911.
1,050,011.
Patented Jan. 7, 1913.
2 SHEETS—SHEET 1.
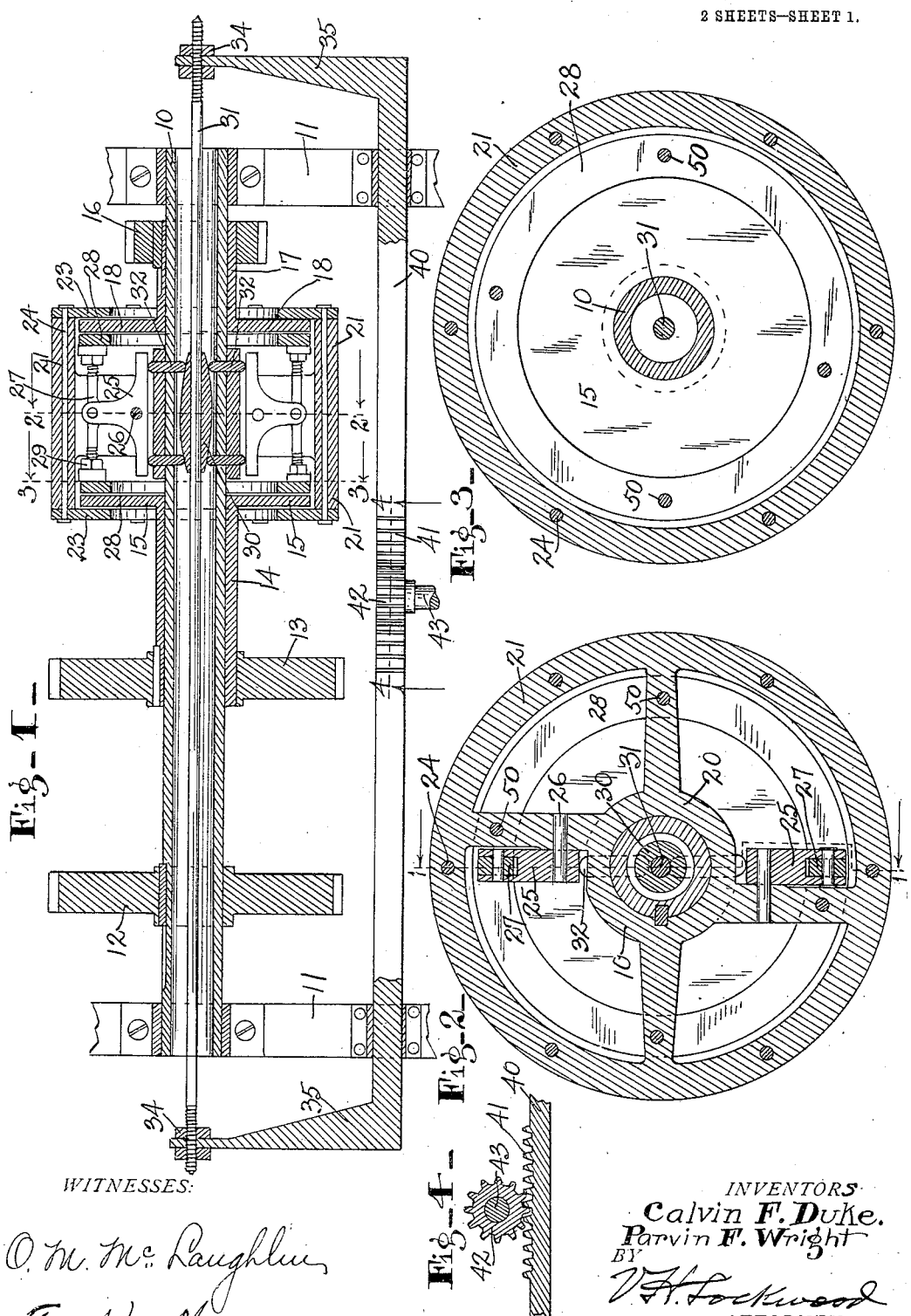
WITNESSES:
O. M. McLaughlin
E. H. Mayo
INVENTORS
Calvin F. Duke.
Parvin F. Wright
BY
V. H. Lockwood
ATTORNEY.

C. F. DUKE & P. F. WRIGHT.
CLUTCH MECHANISM.
APPLICATION FILED NOV. 17, 1911.
1,050,011.
Patented Jan. 7, 1913.
2 SHEETS—SHEET 2.
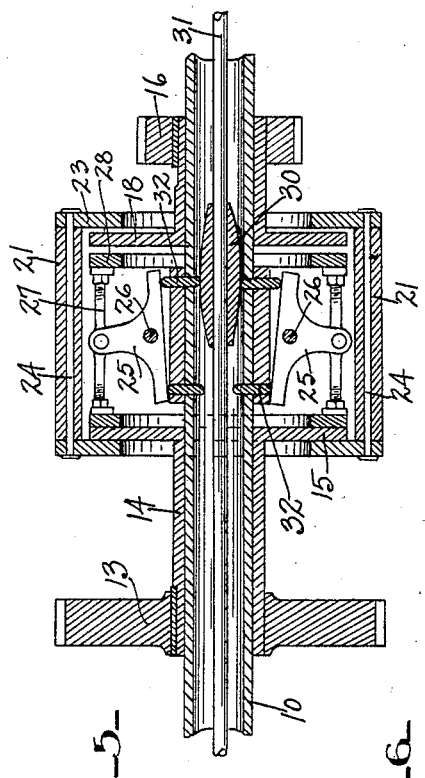
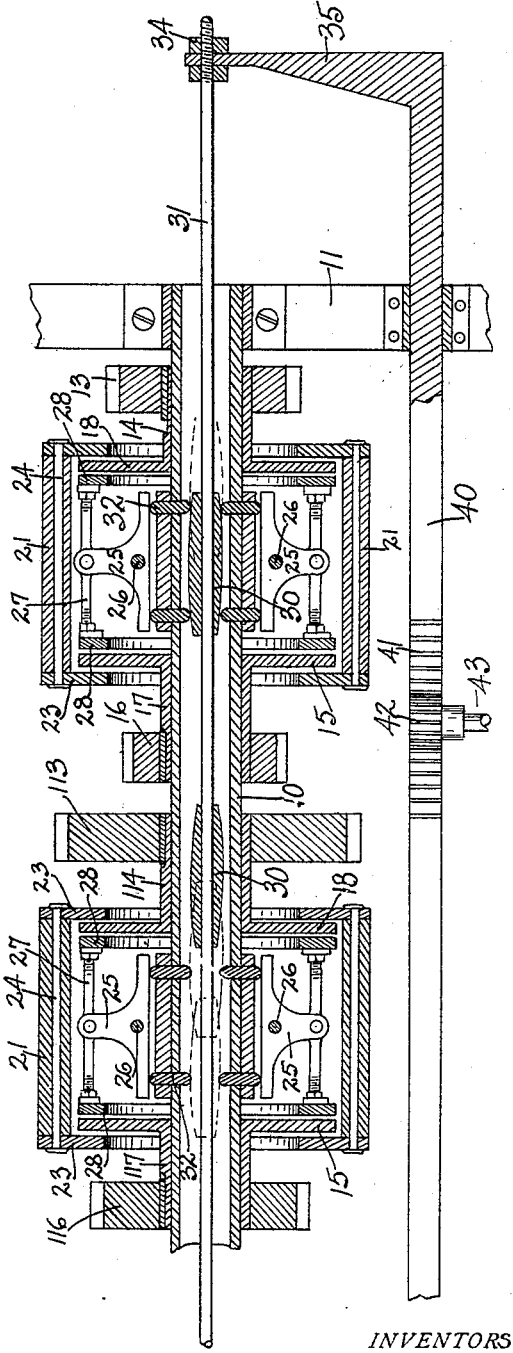
WITNESSES:
O. W. McLaughlin
E. A. Mayo
INVENTORS
Calvin F. Duke
Parvin F. Wright
BY
V. H. Lockwood
ATTORNEY.

UNITED STATES PATENT OFFICE.

CALVIN F. DUKE AND PARVIN F. WRIGHT, OF INDIANAPOLIS, INDIANA.

CLUTCH MECHANISM.

1,050,011.      Specification of Letters Patent.      Patented Jan. 7, 1913.

Application filed November 17, 1911. Serial No. 660,922.

*To all whom it may concern:*

Be it known that we, CALVIN F. DUKE and PARVIN F. WRIGHT, citizens of the United States, and residents of Indianapolis, county of Marion, and State of Indiana, have invented a certain useful Clutch Mechanism; and we do hereby declare that the following is a full, clear, and exact description thereof, reference being had to the accompanying drawings.

The object of this invention is to provide an improved clutch for a speed changing construction for power transmission mechanism suitable for general use and in which the gears may be always enmeshed.

The chief feature of the invention consists of the peculiar friction clutch construction whereby the high speed and low speed gears are actuated. The construction also is such as to yield unusual strength and has been used by us in gasolene tractors of several tons in weight and yet has acted with perfect accuracy and quickness and with every appearance of durability. The construction is also such that it is very easily operated for changing speeds or for running idly.

The nature of the invention will be understood from the accompanying drawings and the following description of the claims.

In the drawings Figure 1 is a vertical longitudinal section through the device on the line 1—1 of Fig. 2, parts being broken away. Fig. 2 is a transverse section on the line 2—2 of Fig. 1. Fig. 3 is a section on the line 3—3 of Fig. 1. Fig. 4 is a section on the line 4—4 of Fig. 1. Fig. 5 is a reproduction of a portion of Fig. 1, showing the clutching mechanism actuated instead of in the neutral position. Fig. 6 is a central vertical section through a modified form of said invention adapted to provide four different speeds.

A tubular driving shaft 10 is mounted on the frame bars 11 at its ends. A driving gear 12 is secured on said shaft for driving it from any suitable source of power. A high speed gear 13 is secured on a sleeve 14 mounted loosely on the shaft 10 and having at one end a radially extending flange or disk 15. A low speed gear 16 is secured on a corresponding sleeve 17 mounted loosely on the shaft 10 and with a disk 18 on the end. The two disks 15 and 18 as shown here are substantially of the same diameter.

A spider or frame 20 is secured on the shaft 10 midway between the disks 15 and 18 and consists of a sleeve with outwardly extending arms carrying a wide rim 21, as seen in Figs. 1 and 2. This rim surrounds the two disks 15 and 18 but does not touch them and slightly overlaps them or extends laterally beyond them. To each lateral edge of the rim 21 a friction ring 23 is secured by bolts 24, which extend through said rings and rim, hence the friction rings 23 are secured in a fixed position and means are provided for clamping either of the disks 15 or 18 against one of said rings 23. Said clamping means here shown consists of a pair of rocking levers 25, one on each side of the frame 20 and fulcrumed by the bolts 26 to the arms of the sleeve of frame 20 at a point about midway between the two disks 15 and 18. Said levers have, at their inner ends, arms extending toward the disks 15 and 18 respectively and spaced away from the sleeve of the frame 20 so that the levers can be rocked in a direction longitudinally of the shaft. Each lever 25 has a radially extending arm projecting out almost to the rim 21 and on its outer end a rod 27 is pivoted about midway of the length of the rod and each end of that rod bears against a clutch ring 28 which is adapted to be pressed against the disk 15 or 18 when the lever 25 is rocked. The space between the rod 27 and the ring 28 is adjustable by means of set nuts 29 on the threaded ends of the said rod 27.

The levers 25 are rocked by a doubly tapering member 30 lying within the shaft 10 and secured on a rod 31 extending through said shaft so that when said rod 31 is moved longitudinally pins 32 will be forced radially against one end of the lever 25 so as to actuate and rock it. Said lever 25 is a double bell crank lever and there are two sets of pins 32, one set actuating said levers at one end and the other set of pins actuating them at the other end, they being engaged and actuated by the tapering ends respectively of the member 30. The pins 32 reciprocate through the shaft 10 and the sleeve of the frame 20. The rod 31 is secured at its ends by nuts 34 to arms 35 extending from the end of a bar 40, which extends transversely through the machine and is radially mounted on the frame bars 11. At 41 it is provided with cogs to form a rack, which rack is engaged by pinion 42 on the shaft 43, which is actuated by hand and therefore, extends to a convenient point for operation. When the shaft 43 is turned to the right the bar 40 will be moved to the left, causing a corresponding left hand movement of the rod 31 and member 30. That would thrust outwardly the left hand set of pins 32 which would engage the left hand ends of levers 25 and would rock said levers so as to throw their outer ends to the right and clamp the low speed disk 18 between the right hand ring 28 and the right hand ring 23. This would put the mechanism on the low gear. An opposite movement of the shaft 43 would put the mechanism on high speed. An intermediate position of the parts would cause the mechanism to run idle. It is thus seen that the high and low speed gears 13 and 16 may always remain in mesh with the gearing which they may drive and do not have to be slipped into or out of gear and, therefore, the mechanism is suitable particularly for heavy machinery which would destroy the gearing if they were slipped into or out of mesh. Furthermore the construction is such that this result is accomplished by a very easy manipulation of the hand regardless of the size of the machinery which is to be driven. No more effort would be required to start a 10 truck car, for instance, than to start a very small machine.

In the modified form, shown in Fig. 6, the invention is arranged for four speeds. This duplicates the clutching mechanism and the gears transmitting power from the shaft. The first speed gear 16 is on the sleeve 17 and the second speed gear 13 is on the sleeve 14, just the reverse of what is shown in Fig. 1. In connection with the other clutch construction there is a three speed wheel 113 on the sleeve 114. There are two cam members 30, one for each clutch construction and arranged on the rod 31 in such relation to each other and to the cam construction as to operate as follows: With the parts, as shown in the neutral position in Fig. 6, if the rod 31 be moved by the bar 40 to the right so as to bring the right-hand cam member 30 to the right-hand dotted line position, it will clutch the gear 16 with the shaft 10. If the rod 31 is moved to the left, the right-hand cam member 30 will be moved to the left-hand dotted line position for it and will then clutch the second speed gear 13 with the shaft. The left-hand cam member will still fail to actuate its clutch mechanism, but when the rod 31 is moved farther to the left, it will cause the clutching of the gear 116 with the shaft and a still further left-hand movement will cause a clutching of the gear 113 with the shaft. When any one gear is clutched with the shaft, the others are idle and all of the four speed wheels may be in constant mesh with gears on the driven shaft, not shown.

As shown in Figs. 2 and 3 the rings 28 are slidable on pins 50 in the arms of the spider 20 and extending toward the friction rings and are rotated thereby. Other driving means may be substituted for this however without departing from the spirit of this invention.

While the clutch members as shown in the drawings make use of but two sets of pins 32 and two rocking levers 25, it is not desired to limit our invention to this particular number as it is obvious that they might be multiplied without departing from the spirit of this invention.

We claim as our invention:

1. A clutch mechanism including a tubular driving shaft, a pair of driven disks loosely mounted thereon, frictional means adjacent said disks and rotatable with said shaft; oscillatory means mounted between said disks for clutching the disks one at a time, a set of pins extending radially through the shaft for engaging and actuating each end of said oscillatory clutching means, a rod longitudinally movable in said shaft, and a double tapered member secured on said rod and within said shaft for acting on said pins and causing the oscillation of said clutching means.

2. A clutch mechanism including a tubular driving shaft, a pair of driven disks loosely mounted thereon, frictional means adjacent said disks and rotatable with said shaft, double bell crank levers mounted between said disks and fulcrumed between their ends so as to rock toward and away from said disks, means carried by the outer ends of said levers for engaging said disks when the levers are rocked, a set of pins extending through the shaft for engaging and actuating each end of said levers, and means within the shaft for actuating one set of said pins at at time.

3. A clutch mechanism including a tubular driving shaft, a pair of driven disks loosely mounted thereon, frictional means adjacent said disks and rotatable with said shaft, double bell crank levers mounted between said disks and fulcrumed between their ends so as to rock toward and away from said disks, means carried by the outer ends of said levers for engaging said disks when the levers are rocked, a set of pins extending through the shaft for engaging and actuating each end of said levers, a longitudinally movable rod within said shaft, and a double tapered member secured on said rod with a series of pins so that when said member moves in one direction it will actuate one set of pins and release the other set of pins.

4. A clutch mechanism including a tubular driving shaft, a pair of driven disks loosely mounted thereon, frictional means adjacent said disks and rotatable with said shaft, double bell crank levers mounted between said disks and fulcrumed between their ends so as to rock toward and away from said disks, means carried by the outer ends of said levers for engaging said disks when the levers are rocked, a set of pins extending through the shaft for engaging and actuating each end of said levers, a longitudinally movable rod within said shaft, a double tapered member secured on said rod with a series of pins so that when said member moves in one direction it will actuate one set of pins and release the other set of pins, a sliding bar provided with arms connected with the ends of said rod, and means for shifting said bar.

5. A clutch mechanism including a tubular driving shaft, a pair of driven disks loosely mounted thereon, frictional means adjacent said disks and rotatable with said shaft, double bell crank levers mounted between said disks and fulcrumed between their ends so as to rock toward and away from said disks, means carried by the outer ends of said levers for engaging said disks when the levers are rocked, a set of pins extending through the shaft for engaging and actuating each end of said levers, a longitudinally movable rod within said shaft, a double tapered member secured on said rod with a series of pins so that when said member moves in one direction it will actuate one set of pins and release the other set of pins, a sliding bar provided with arms connected with the ends of said rod and having a rack thereon, a pinion engaging the rack, and a shaft on which said pinions are mounted whereby said mechanism may be operated by hand.

6. A clutch mechanism including a tubular driving shaft, a pair of driven disks loosely mounted thereon, a frame secured to the shaft between the disks with a rim surrounding the disks, clamping rings secured to the lateral edges of said rim adjacent the outer surfaces of said disks, double bell crank levers fulcrumed between their ends to said frame, rods pivoted on the outer ends of said levers and extending toward said disks, rings secured to the ends of said rods and adjacent said disks so that when said levers are rocked they will clamp one disk and release the other, a series of pins extending through said shaft in engagement with each end of said levers, and means operatable within the shaft for actuating one set of said pins at a time and releasing the other set of pins.

In witness whereof, we have hereunto affixed our signatures in the presence of the witnesses herein named.

CALVIN F. DUKE.
PARVIN F. WRIGHT.

Witnesses:
G. H. BOINK,
E. H. MAYO.

Copies of this patent may be obtained for five cents each, by addressing the "Commissioner of Patents, Washington, D. C."